United States Patent [19]

Siewert et al.

[11] Patent Number: 4,793,457
[45] Date of Patent: Dec. 27, 1988

[54] SNAP-ON DUST SHIELD FOR AUTOMOTIVE COMPESSOR CLUTCH

[75] Inventors: Herbert G. Siewert, Sylvania, Ohio; Russell A. Cowen, Brooklyn, Mich.

[73] Assignee: Tecumseh Products Company, Tecumseh, Mich.

[21] Appl. No.: 36,912

[22] Filed: Apr. 10, 1987

[51] Int. Cl.[4] .............................................. F16D 27/14
[52] U.S. Cl. ..................... 192/112; 192/84 C; 74/609; 474/144; 474/166; 474/273
[58] Field of Search ................ 192/112, 84 A, 84 C, 192/84 B, 84 T; 74/609; 474/144, 166, 273; 301/37 P, 37 PB, 37 TP, 108 A

[56] References Cited

U.S. PATENT DOCUMENTS

| 1,089,971 | 3/1914 | Schoepke | 74/609 |
| 2,641,346 | 6/1953 | Risk et al. | 192/112 |
| 2,816,566 | 12/1957 | Warren | 74/608 |
| 2,903,840 | 9/1959 | Teupel et al. | 57/1 R |
| 2,964,961 | 12/1960 | Gulick | 74/423 |
| 3,067,630 | 12/1962 | Hartman | 74/608 |
| 3,293,930 | 12/1966 | Schlesinger et al. | 474/144 |
| 3,380,791 | 4/1968 | Peck | 301/108 A |
| 3,386,312 | 6/1968 | Weasler | 74/609 |
| 3,641,840 | 2/1972 | Rossler et al. | 74/609 |
| 3,743,068 | 7/1973 | Westervelt et al. | 192/84 C |
| 3,823,982 | 7/1974 | Spisak | 301/37 P |
| 3,883,181 | 5/1975 | Dissinger | 301/37 P |
| 3,912,336 | 10/1975 | Ritter, Jr. et al. | 305/12 |
| 4,511,182 | 4/1985 | Birnbaum | 301/37 P |

FOREIGN PATENT DOCUMENTS

| 2706073 | 8/1978 | Fed. Rep. of Germany | 301/108 A |
| 1254929 | 1/1961 | France | 192/84 A |
| 47019 | 4/1980 | Japan | 192/84 C |

Primary Examiner—Rodney H. Bonck
Assistant Examiner—David A. Testardi
Attorney, Agent, or Firm—Albert L. Jeffers; John F. Hoffman

[57] ABSTRACT

A shield for an automotive compressor clutch assembly comprises a resilient hollow part that attaches to the rotatable clutch pulley by means of an annular lip located along the inside of the hollow part and an annular groove located along the outer rim of the pulley, thereby covering the outside surface of the pulley together with the clutch mechanism located adjacent thereto. A cooperating notch and land arrangement prevents relative rotational movement between the shield and the pulley.

15 Claims, 3 Drawing Sheets

SNAP-ON DUST SHIELD FOR AUTOMOTIVE COMPESSOR CLUTCH

BACKGROUND OF THE INVENTION

The present invention relates to an automotive compressor and in particular to a snap-on cover that is easily installed onto the compressor clutch pulley to prevent circulation of dust through the compressor clutch assembly, thereby increasing the service life of the clutch assembly.

More particularly, the present invention is applicable to a compressor clutch assembly in which a pulley is continuously driven and torque is selectively transmitted to the compressor crankshaft by a clutch mechanism. In such an arrangement, the clutch assembly is located adjacent to the pulley on the side of the pulley opposite the compressor housing. Exposure of the clutch mechanism to a harsh operating environment, i.e., in an agricultural application, causes premature failure of clutch components, particularly the clutch pulley bearings.

A metal cover attached with screws to the front surface of the pulley has been used to limit the flow of air through the compressor clutch assembly. A flexible segmented clutch enclosure for attaching with screws to a stationary bell housing has been used in automotive transmission applications to prevent entry of foreign material into the clutch parts. In U.S. Pat. No. 1,089,972, a safety shield for a friction clutch mechanism is disclosed wherein a hollow guard member is secured to the pulley by screws or bolts inward with respect to the pulley rim.

In each of the aforementioned clutch covers, a problem arises in that additional pulley size and material is required of providing holes to attach the cover to the pulley b means of screws or bolts. This increases the weight and space requirements for the compressor assembly and there is a possibility of the screws loosening as a result of engine vibration. Furthermore, increased difficulty and, thus, higher manufacturing costs are associated with installing and removing bolt-on covers.

SUMMARY OF THE INVENTION

The problems and disadvantages of the aforementioned clutch covers are overcome by the present invention wherein a resilient dust shield is easily secured to a clutch pulley by a snap fit. It is desired to provide a compressor clutch assembly cover that is easily attached to the clutch pulley of an automotive compressor without screws or bolts, and does not, therefore, unduly increase the size and manufacturing costs of the compressor assembly.

Accordingly, the present invention provides a resilient dust shield for easy attachment to a compressor pulley, wherein cooperatively mating members are located on each of the clutch pulley and the dust shield.

More specifically, in accord with one form of the present invention, a resilient hollow dust shield having a single open end is provided with an annular lip located near the open end on the inside of the shield. The annular lip cooperatively engages with an annular groove on the outer rim surface of the clutch pulley to provide an effective seal over the front surface of the pulley. During acceleration and deceleration of the pulley, an axial land on the inside of the shield fits within a corresponding axial notch in the outer rim surface of the pulley to prevent relative rotational movement between the pulley and the shield.

The dust cover blocks the path of air flow to prevent the clutch mechanism from operating like a centrifugal fan and inducing air flow through the clutch components. Accordingly, the device limits the exposure of the mechanism to airborne contaminants and shields the clutch components from direct impingement of foreign materials, such as cleaning fluids, hydraulic fluids, rain, solvents, chemicals, and the like.

One advantage of the dust shield of the present invention is the simplicity of installation and removal, resulting in lower manufacturing and service costs.

Another advantage of the present invention is that the clutch pulley diameter need not be made larger and pulley material need not be added to accommodate mounting screw holes.

A further advantage of the present invention is the elimination of clutch cover mounting screws, which can loosen under conditions of shock and vibration.

The invention in one form thereof, provides a dust shield for the front surface of a pulley in a compressor assembly. The shield is a resilient hollow part having an open end to fit substantially over the front surface of the pulley. A plurality of protrusions on one of the pulley and the hollow part and a plurality of corresponding depressions in the other of the pulley and the hollow part cooperatively mate to attach the shield to the pulley.

The invention further provides, in one form thereof, provides a dust shield for the front surface of a pulley in a compressor assembly including a housing and the pulley. The dust shield comprises a resilient hollow part having an open end to fit over the front surface of the pulley. One of the hollow part and the pulley has an annular groove and the other has a corresponding annular lip for cooperatively engaging one another to removeable mount the hollow part of the pulley.

The invention further provides, in one form thereof, a dust shield for covering the front surface of a pulley in a compressor assembly including a housing and the pulley, the pulley having a front surface, a back surface, and an outer rim surface. The dust shield comprises a resilient hollow part having an open end, including an annular lip located adjacent to the open end on the inside of the hollow part. The annular lip cooperatively engages with an annular groove in the outer rim surface, whereby the front surface of the pulley is effectively sealed and protected from ambient contamination.

The invention, in one form thereof, still further provides a dust shield for a compressor assembly including a housing, a crankshaft, and a clutch assembly. The clutch assembly comprises a pulley rotatably mounted axially to but independent of the rotation of the crankshaft and a hub assembly mounted to the distal end of the crankshaft and being rotatable therewith. The pulley is continuously driven while the hub assembly is selectively engaged with the pulley for driving the crankshaft. The pulley is located between the housing and the hub assembly and the dust shield is attachable to the pulley for protecting the hub assembly from ambient contamination. The dust shield comprises a resilient plastic hollow part having an open end and including an annular lip located adjacent to the open end on the inside of the hollow part. The annular lip has a radius that cooperatively engages with an annular groove in the outer rim surface of the pulley. The hollow part further includes an annular rib located inside the hollow part and positioned substantially parallel to and inward from the annular rib. Accordingly, an annular recess is formed between the annular lip and the annular rib into which fits an annular land formed on the pulley by the annular groove and the front surface of the pulley, thereby providing added rigidity to the hollow part and a stop against which the front surface of the pulley abuts when the dust shield is installed onto the pulley.

It is an object of the present invention to provide a clutch assembly dust shield that does not require screws or bolts for mounting to the clutch pulley.

It is another object of the present invention to provide a shield attachable to a pulley so that increased pulley size and weight is not required.

It is yet another object of the present invention to provide a dust shield that is quickly and easily installed and removed.

A further object of the present invention is to provide a compressor clutch assembly dust shield that is resistant to harsh operating environments.

A still further object of the present invention, in one form thereof, is to provide a clutch assembly dust shield attachable to a rotating pulley that does not rotate relative to the pulley during acceleration or deceleration of the pulley.

These and other objects of the present invention will become apparent from the detailed description taken together with the accompanying drawings.

DESCRIPTION OF THE PREFERRED EMBODIMENT

Figure 1:
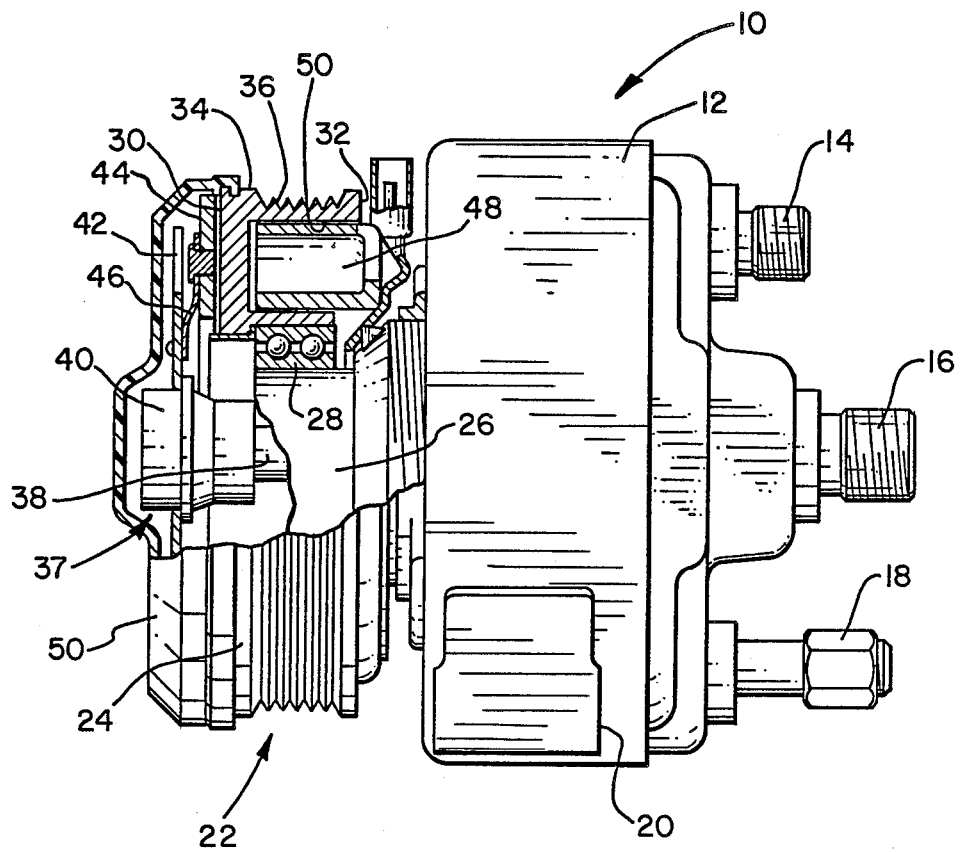
FIG. 1 is a partially sectioned view of an automotive compressor including a dust shield according to the present invention.

Referring now to the drawings, there is shown a compressor 10 of the type to which the present invention is applicable. Compressor 10 includes a compressor housing 12 from which extend a discharge outlet 14, a suction inlet 16 and a relief valve 18. The operation and structure of compressor 10 is described in U.S. Pat. No. 4,273,519, the disclosure of which is hereby incorporated by reference. At least one mounting bracket 20 is provided for mounting the compressor 10 in an automotive application.

The compressor 10 is selectively driven by means of a clutch assembly 22 that will now be more particularly described. The clutch assembly 22 includes a clutch pulley 24 rotatably supported on a pedestal 26 of the compressor housing 12 by means of bearings 28. Pulley 24 includes a front surface 30, a back surface 32 and an outer rim surface 34 having pulley grooves 36 for engaging with a drive belt from a source of motive power.

Clutch assembly 22 further includes a hub assembly 37 mounted to the distal end of a compressor crankshaft 38. A hub 40 is attached to crankshaft 38 by means of, for example, a bolt or nut. In the embodiment shown in FIG. 1, a clutch torque plate 42 is welded onto hub 40. Torque plate 42 is connected to a clutch armature 44 through clutch springs 46.

A clutch coil 48 is received within an annular recess 50 in pulley 24 so that when coil 48 is energized, clutch armature 44 is pulled against the rotating pulley 24 and turns clutch torque plate 42. Torque plate 42 is welded hub 40, which is attached to shaft 38. Thus, shaft 38 is driven by pulley 24 when coil 48 is energized.

In the usual manner of operating compressor 10 without a clutch pulley cover, ambient air is allowed to flow uninhibited through clutch assembly 22. Efforts to stop this air flow, with its attendant dirt and debris, have included pulley covers attachable to the front surface 30 of pulley 24. Such covers are typically screwed or bolted on, thus requiring pulley diameters greater than that of the clutch armature 44 to accommodate screw holes. This unnecessarily increases the size of the compressor/clutch assembly 10. Pulley covers which screw or bolt on are also more difficult to assemble and, therefore, increase the cost of manufacturing the compressor.

The present invention alleviates the above problems by providing a pulley cover which attaches to the clutch pulley without the use of screws or bolts. Specifically, in the preferred embodiment of the present invention, a dust shield 50 attaches to the outer rim surface 34 of clutch pulley 24, thereby allowing the diameters of pulley 24 and clutch armature 44 to be substantially the same. Accordingly, pursuant to the present invention, dust shield 50, as shown in FIG. 1, attaches to pulley 24 and encloses front surface 30.

Figure 2:
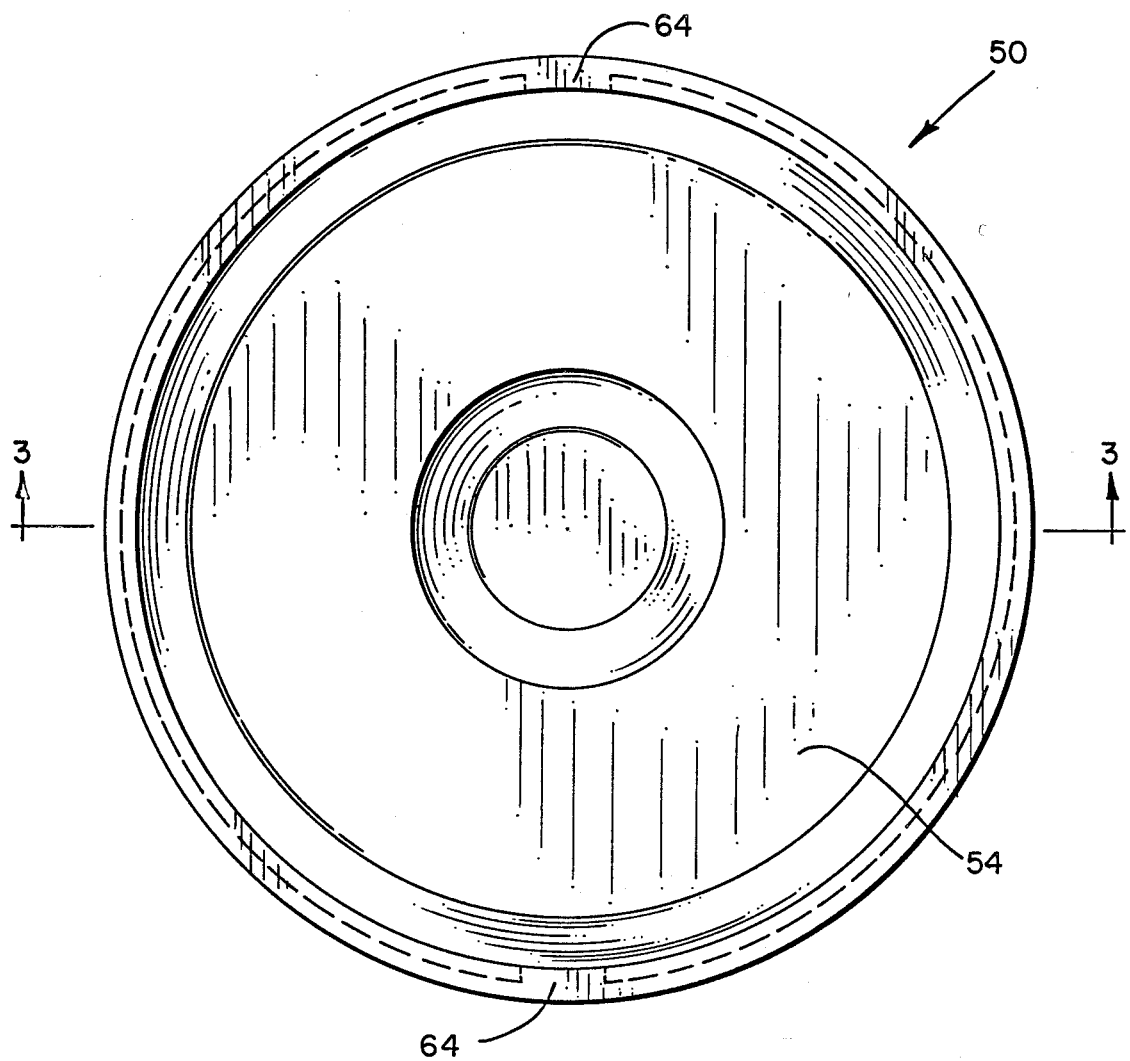
FIG. 2 is a rear view of a dust shield according to the preferred embodiment of the present invention.
Figure 3:
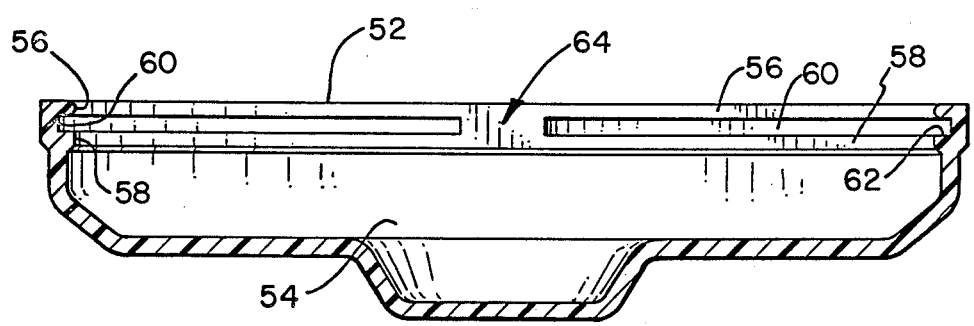
FIG. 3 is a sectional side view of the dust shield of FIG. 2.

Dust shield 50 will no be more particularly described in connection with FIGS. 2 through 6. As illustrated in FIGS. 2 and 3, dust shield 50 is a cylindrical hollow part including an open end 52 and having a diameter dependent upon the pulley to which the shield will be installed. A contoured hollow inside surface 54 provide clearance from the rotating clutch armature 44, clutch torque plate 42, and hub 40 when shield 50 is attached to pulley 24. An annular lip 56, located adjacent to open end 52, extends along inside surface 54 (FIG. 3). Annular lip 56 may include a radius, as shown in FIG. 3, to ease installation and removal of the dust shield 50.

An annular rib 58 extends along inside surface 54 substantially parallel to annular lip 56 and inward from open end 52. Annular rib 58, together with annular lip 56, form an annular recess 60. Annular recess 60 includes an annular stop surface 62.

Dust shield 50 includes at least one land 64 extending axially relative to the axis of rotation of shield 50 when installed on pulley 24. In the illustrated embodiment, a pair of lands 64 are form by a discontinuity of annular recess 60 at locations diametrically opposite one another. It should be understood, therefore, that in practicing the principles of the present invention, annular recess 60 formed by annular lip 56 and annular rib 58 need not extend completely around inside surface 54 of shield 50.

Figure 4:
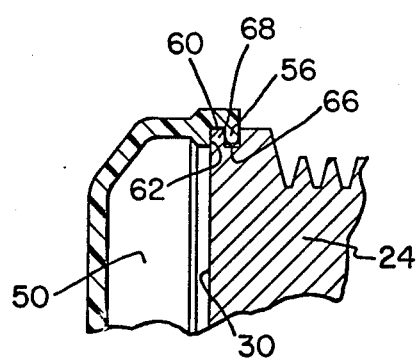
FIG. 4 is an enlarged fragmentary sectional view of the dust shield and clutch pulley particularly showing the cooperatively engaged annular lip and annular groove.
Figure 5:
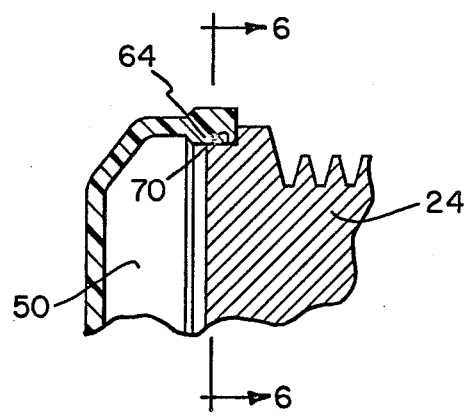
FIG. 5 is an enlarged fragmentary sectional view of the dust shield and clutch pulley particularly showing the axial land and axial notch and FIG. 6 is a fragmentary sectional view of FIG. 5 taken along the line 6—6 and viewed in the direction of the arrows.

Dust shield 50 attaches to clutch pulley 24 as shown generally in FIG. 1 and in more detail in FIGS. 4 and 5. As previously described, shield 50 is resilient and yields during installation so that annular lip 56 is received cooperatively into a corresponding annular groove 66 located on the outer rim surface 34 of pulley 24, thereby providing a snap-on mounting of dust shield 50. The lip and groove mounting arrangement further provides a good seal against contaminated air reaching the clutch mechanism. A radius on annular lip 56 eases installation and removal of the dust shield 50. Shield 50 is easily removed by prying it off with a screwdriver.

An annular land 68 on outer rim surface 34 is defined by annular groove 66 and front surface 30 of pulley 24. The annular land 68 cooperatively engages with annular recess 60 of dust shield 50. In this arrangement, annular stop surface 62 of dust shield 50 abuts against front surface 30 of pulley 24 to provide a better seal and more reliable attachment of shield 50 to pulley 24. The combination of annular lip 56 and annular rib 58 also add strength and rigidity to dust shield 50.

During operation of the compressor, pulley 24 experiences rotational acceleration and deceleration. If dust shield 50 is attached to pulley 24 by means of a continuous annular lip and groove seal, shield 50 may rotate relative to pulley 24 during periods of acceleration and deceleration due to the inertia of shield 50. Unchecked rotation of shield 50 relative to pulley 24 will eventually result in degradation of the seal and failure of shield 50 to remain attached to pulley 24.

Figure 6:
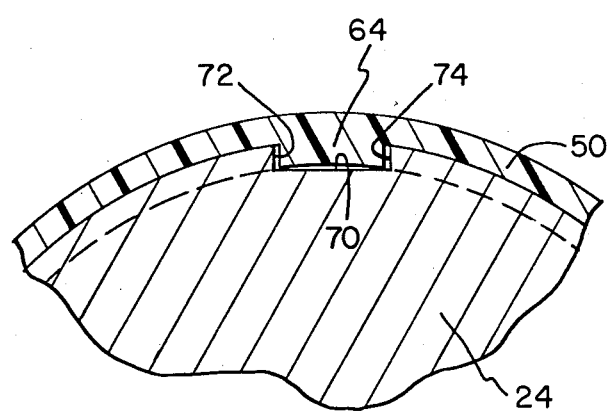

FIGS. 3, 5 and 6 illustrate means for locking dust shield 50 to pulley 24 to prevent relative rotation between one another. Each land 64 in shield 50 cooperatively engages with a corresponding notch 70 in pulley 24. Notch 70, as illustrated, is an axial channel having sides 72 and 74 to abut with the corresponding land 64 when relative rotation between shield 50 and pulley 24 is attempted. It will be appreciated that notch 70 interrupts annular land 68 and, therefore, annular land 68 does not extend completely around the outer rim surface 34 of pulley 24.

Dust shield 50 is made of a resilient material in order to yield somewhat during installation onto pulley 24. In one embodiment, shield 50 is molded from polystyrene plastic material, which has been found to be resistant to the chemicals encountered in an agricultural operating environment. Because of the resiliency of the plastic material, shield 50 may be removed from a mold despite the reverse sections caused by annular lip 56 and annular rib 58.

The invention has been described in terms of cooperatively joining lip and groove members as well as land and recess members. It is appreciated that assignment of each mating member to a respective joining part may be reversed without departing from the scope of the invention.

It is contemplated that alternative mating members for attaching dust shield 50 to pulley 24 may be employed with departing from the scope or spirit of the present invention. For example, in addition to the lip and groove arrangement described herein, mating protrusions and depressions, protuberances and dimples, or teeth and counterteeth or grooves alternatively provide means for cooperatively joining the dust shield to the pulley.

Although the dust shield 50 is shown as engaging the outer periphery of the flywheel pulley, it would be possible to form an inwardly facing annular surface on pulley 24 and including either a bead or a groove which would be engaged by the outer peripheral surface of the dust shield. However, the structure shown in the drawings is preferred as it does not result in an increase in the diameter of the pulley as would the alternate embodiment.

Alternative resilient materials may also be used to provide dust shield 50 with the necessary resiliency to yield when being mounted to pulley 24. For example, various operating environments may dictate different material properties for the dust shield.

While this invention has been described as having a preferred design, it will be understood that is capable of further modification. This application is, therefore, intended to cover any variations, uses, or adaptations of the invention following the general principles thereof and including such departures from the present disclosure as come within the known or customary practice in the art to which this invention pertains and fall within the limits of the appended claims.

What is claimed is:

1. In a compressor assembly including a pulley having a front surface, a dust shield attachable to the pulley for substantially covering the front surface, comprising:
   a resilient hollow part having an open end to fit substantially over the front surface of the pulley, there being a protrusion on one of the pulley and the hollow part and a corresponding depression in the other of the pulley and the hollow part, the protrusion and corresponding depressing resiliently cooperatively mating to attach the shield to the pulley, said hollow part and said pulley being positively interlocked together against rotation relative to each other.

2. The compressor assembly of claim 1 wherein:
   the pulley has an outer rim surface on which the protrusion and corresponding depression cooperatively mate.

3. The assembly of claim 1 including a plurality of said protrusions and depressions.

4. In a compressor assembly including a housing, a pulley, and a clutch assembly on the pulley, said pulley having an outer rim surface and a front surface, a dust shield attachable to the pulley for covering the clutch assembly, comprising:
   a resilient hollow part having an open end to fit over the front surface of the pulley and the clutch assembly, one of the hollow part and the pulley having an annular groove and the other of the hollow part and the pulley having a corresponding annular lip for removably mounting the hollow part to the pulley, said hollow part including interlocking means for positively preventing relative rotational movement between said hollow part and pulley.

5. The compressor assembly of claim 4 wherein said interlocking means comprises:
   one of the hollow part and the pulley having an axial land and the other of the hollow part and pulley having an axial notch that cooperatively engage to prevent relative rotational movement between the hollow part and the pulley when the hollow part is mounted to the pulley.

6. The compressor assembly of claim 4 wherein the annular lip includes a radius, whereby the dust cover is easy to install on and remove from the pulley.

7. The compressor assembly of claim 6 wherein:
   the hollow part is made of a polystyrene plastic material, whereby the dust shield is resistant to harsh ambient operating conditions.

8. In a compressor assembly including a housing and a pulley, having a front surface, a back surface, an an outer rim surface, a dust shield for covering the front surface of the pulley, comprising:
- a resilient hollow part having an open end, including an annular lip located adjacent to the open end on the inside of the hollow part, the annular lip being resiliently snap fit in an annular groove in the outer rim surface of the pulley, whereby the front surface of the pulley is effectively sealed and protected from ambient contamination, and
- locking means for preventing relative rotational movement between the hollow part and the pulley, whereby during acceleration or deceleration of the pulley, the dust shield will be prevented from rotating relative to the pulley.

9. The compressor assembly of claim 8 wherein:
the locking means comprises at least one axial land on one of the inside of the hollow part and the outer rim surface for cooperatively engaging with a corresponding axial notch in the other of the inside of the hollow part and the outer rim surface.

10. The compressor assembly of claim 9 wherein:
the annular lip includes a radius, whereby the dust cover is easy to install on and remove from the pulley.

11. The compressor assembly of claim 10 wherein:
the hollow part is made of a polystyrene plastic material, whereby the dust shield is resistant to harsh ambient operating conditions.

12. In a compressor assembly including a housing, a crankshaft, and a clutch assembly comprising a pulley rotatably mounted axially to but independent of the rotation of the crankshaft and a hub assembly mounted to the distal end of the crankshaft and being rotatable therewith, wherein the pulley is continuously driven while the hub assembly is selectively engaged with the pulley for driving the crankshaft, the pulley having a front surface and an outer rim surface and being located between the housing and the hub assembly with the hub assembly and front surface being adjacent to one another, a dust shield attachable to the pulley for protecting the hub assembly from ambient contamination, comprising:
- a resilient plastic hollow part having an open end and including an annular lip located adjacent to the open end on the inside of the hollow part, the annular lip having a radius and cooperatively engaging with an annular groove in the outer rim surface of the pulley, the hollow part further including an annular rib located inside the hollow part and positioned substantially parallel to and inward from the annular lip whereby an annular recess is formed between the annular lip and the annular rib into which fits an annular land formed on the pulley by the annular groove and the front surface of pulley, thereby providing added rigidity to the hollow part and a stop against which the front surface of the pulley abuts when the dust shield is installed onto the pulley to cover the clutch assembly, and
- locking means for preventing relative rotational movement between the hollow part and the pulley, whereby during acceleration or deceleration of the pulley, the dust shield will be prevented from rotating relative to the pulley.

13. The compressor assembly of claim 12 wherein:
the locking means comprises at least one axial land on one of the inside of the hollow part and the outer rim surface for cooperatively engaging with a corresponding axial notch in the other of the inside of the hollow part and outer rim surface.

14. In an compressor assembly including a pulley and clutch assembly on the pulley, a dust shield attachable to the pulley for substantially covering the clutch assembly, comprising:
- a resilient hollow part having an open end to fit on the pulley and enclose the clutch assembly, there being a protrusion on one of the pulley and the hollow part and a corresponding depression in the other of the pulley and the hollow part, the protrusion and corresponding depression resiliently cooperatively mating to attach the shield to the pulley by means of a snap fit, and
- cooperating locking means on said hollow part and pulley for positively preventing relative rotational movement between said hollow part and pulley.

15. The compressor assembly of claim 14 wherein:
the pulley has an outer rim surface on which the protrusion and corresponding depression cooperatively mate.

* * * * *